(12) United States Patent
Callahan

(10) Patent No.: US 10,584,623 B2
(45) Date of Patent: Mar. 10, 2020

(54) EXHAUST HEAT RECOVERY AND ACOUSTIC VALVE

(71) Applicant: Faurecia Emissions Control Technologies, USA, LLC, Columbus, IN (US)

(72) Inventor: Joseph E. Callahan, Greenwood, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 25 days.

(21) Appl. No.: 15/618,733

(22) Filed: Jun. 9, 2017

(65) Prior Publication Data

US 2018/0355778 A1 Dec. 13, 2018

(51) Int. Cl.
  *F01N 5/02* (2006.01)
  *F01N 3/02* (2006.01)
  *F01N 3/04* (2006.01)
  *F01N 1/16* (2006.01)

(52) U.S. Cl.
  CPC ............. *F01N 5/02* (2013.01); *F01N 1/166* (2013.01); *F01N 3/0205* (2013.01); *F01N 3/043* (2013.01); *F01N 2240/02* (2013.01); *F01N 2410/00* (2013.01)

(58) Field of Classification Search
  USPC ......... 60/274, 287, 288, 289, 291, 292, 298, 60/320, 321, 324
  See application file for complete search history.

(56) References Cited

U.S. PATENT DOCUMENTS

| 7,527,126 | B2 | 5/2009 | Kuroda et al. |
| 8,146,344 | B2* | 4/2012 | Harada ..................... F01N 5/02 |
| | | | 60/277 |
| 8,397,863 | B2 | 3/2013 | Paze |
| 8,646,262 | B2* | 2/2014 | Magnetto ............... F01M 5/001 |
| | | | 165/51 |
| 9,109,481 | B2* | 8/2015 | Martin ..................... F01N 9/00 |
| 2004/0144084 | A1* | 7/2004 | Hara ...................... B60H 1/025 |
| | | | 60/288 |
| 2007/0272480 | A1* | 11/2007 | Kuroda .............. B01D 53/9454 |
| | | | 181/254 |

(Continued)

FOREIGN PATENT DOCUMENTS

JP 2016102446 A 6/2016

*Primary Examiner* — Binh Q Tran
(74) *Attorney, Agent, or Firm* — Carlson, Gaskey & Olds P.C.

(57) ABSTRACT

A vehicle exhaust system includes an exhaust pipe defining an exhaust gas flow path, a heat recovery device connected to the exhaust pipe, and a diverter valve that controls exhaust gas flow between the exhaust pipe and heat recovery device. The diverter valve is moveable between at least a heat recovery mode where the diverter valve blocks flow through the exhaust pipe and directs flow into the heat recovery device, a full bypass acoustic mode where the diverter valve blocks flow through the heat recovery device and directs flow through the exhaust pipe, a transition mode where the diverter valve partially blocks flow through the heat recovery device and partially blocks flow through the exhaust pipe, and a partial bypass acoustic mode where the diverter valve blocks flow through the heat recovery device and partially blocks flow through the exhaust pipe.

25 Claims, 9 Drawing Sheets

(56) References Cited

U.S. PATENT DOCUMENTS

2011/0099989 A1\* 5/2011 Prior ............... F01N 3/043
 60/320
2015/0275739 A1\* 10/2015 Ishihata ............ F01N 13/08
 60/324
2016/0169075 A1 6/2016 Dobryden et al.

\* cited by examiner

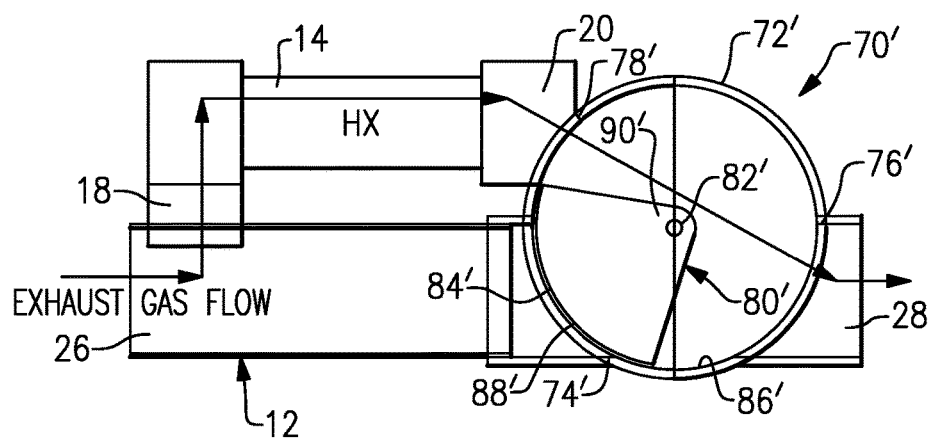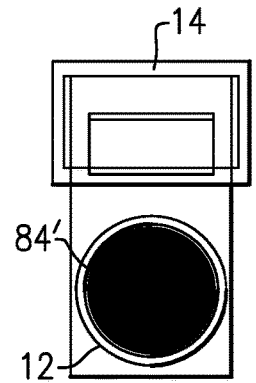
FIG.10A    FIG.10B
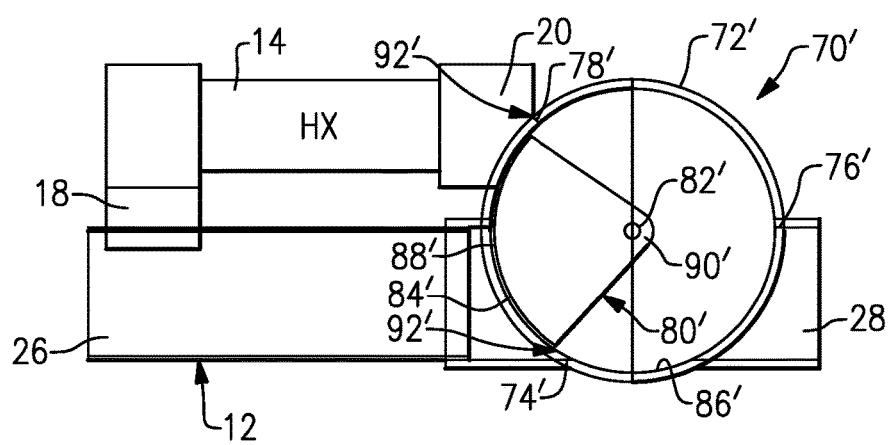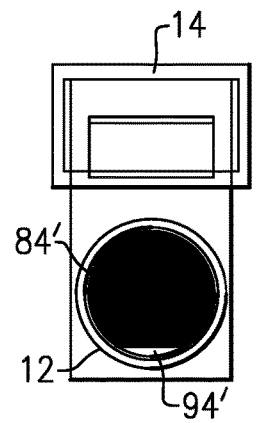
FIG.11A    FIG.11B

EXHAUST HEAT RECOVERY AND ACOUSTIC VALVE

BACKGROUND OF THE INVENTION

An exhaust system conducts hot exhaust gases generated by an engine through various exhaust components to reduce emissions and control noise. The heat energy contained in exhaust gases represents almost a third of the energy contained in the fuel. An exhaust heat recovery system (EHRS) is used to transfer this energy to another vehicle device or to a fluid, such as a coolant liquid for example. The EHRS includes a valve that is positioned within an exhaust system component to control exhaust flow into a heat exchanger.

Traditional exhaust systems also include acoustic valves that are used for noise attenuation purposes. Often multiple acoustic valves are required, dependent upon the type of vehicle application, to address specific ranges of noise such as low and high frequency noises. The incorporation of multiple valves for noise control and the EHRS significantly increases the cost of the exhaust system.

SUMMARY OF THE INVENTION

In one exemplary embodiment, a vehicle exhaust system includes an exhaust pipe defining an exhaust gas flow path, a heat recovery device connected to the exhaust pipe, and a diverter valve that controls exhaust gas flow between the exhaust pipe and heat recovery device. The diverter valve is moveable between at least a heat recovery mode where the diverter valve blocks flow through the exhaust pipe and directs flow into the heat recovery device, a full bypass acoustic mode where the diverter valve blocks flow through the heat recovery device and directs flow through the exhaust pipe, a transition mode where the diverter valve partially blocks flow through the heat recovery device and partially blocks flow through the exhaust pipe, and a partial bypass acoustic mode where the diverter valve blocks flow through the heat recovery device and partially blocks flow through the exhaust pipe.

In a further embodiment of the above, the diverter valve comprises a single valve for exhaust heat recovery and acoustic noise control.

In a further embodiment of any of the above, the heat recovery device is mounted in parallel to the exhaust pipe and has a device inlet in fluid communication with the exhaust pipe and a device outlet in fluid communication with the exhaust pipe, the device outlet being downstream of the device inlet.

In a further embodiment of any of the above, a barrel housing connects the exhaust pipe to the device outlet, and wherein the diverter valve is rotatably mounted within the barrel housing.

In a further embodiment of any of the above, the diverter valve comprises a valve body having a first opening, a second opening facing opposite the first opening, and a third opening positioned between the first and second openings, and wherein the valve body includes a curved portion facing an inner surface of the barrel housing.

In a further embodiment of any of the above, the diverter valve has an outermost peripheral surface that does not contact an inner surface of the barrel housing as the diverter valve rotates within the barrel housing.

In a further embodiment of any of the above, the system further includes a curved valve housing connecting the exhaust pipe to the device outlet, the curved housing having a first opening in fluid communication with an upstream portion of the exhaust pipe, a second opening downstream of the first opening and in fluid communication with the exhaust pipe, and a third opening in fluid communication with the device outlet, and wherein the diverter valve comprises a valve body supported on a shaft for rotation relative to the curved housing, the valve body includes a curved portion spaced apart from an inner surface of the barrel housing by a gap.

In a further embodiment of any of the above, the system further includes an electronic controller that controls movement of the diverter valve between the heat recovery mode, the full bypass acoustic mode, the transition mode, and the partial bypass acoustic mode.

One exemplary method of controlling exhaust gas flow through a vehicle exhaust system comprises: connecting a heat recovery device to an exhaust pipe; and positioning a diverter valve to control exhaust gas flow between the exhaust pipe and the heat recovery device such that the diverter valve is moveable between at least the heat recovery mode, the full bypass acoustic mode, the transition mode, and the partial bypass acoustic mode.

These and other features of this application will be best understood from the following specification and drawings, the following of which is a brief description.

BRIEF DESCRIPTION OF THE DRAWINGS

FIG. 10A is a side view of another example of a diverter valve in a heat recovery mode.

FIG. 10B is an inlet end view of the diverter valve of FIG. 10A.

FIG. 11A is a side view of another example of a diverter valve in a transition mode.

FIG. 11B is an inlet end view of the diverter valve of FIG. 11A.

DETAILED DESCRIPTION

Figure 1A:
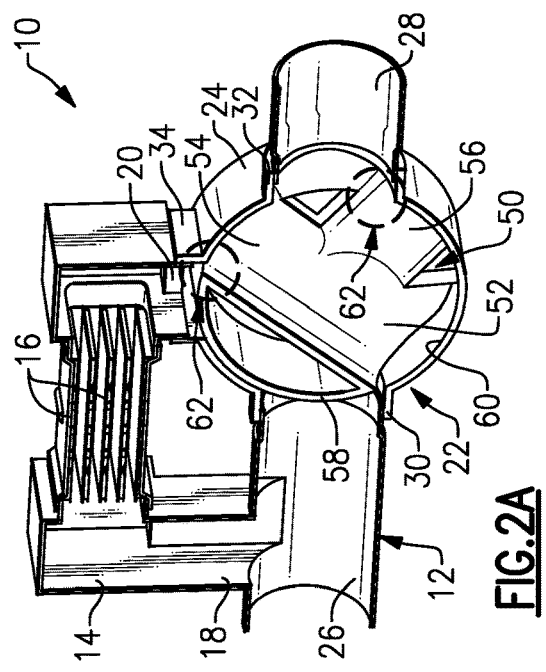
FIG. 1A is a perspective section view of a diverter valve in a heat recovery mode.

FIG. 1 shows a portion of a vehicle exhaust system 10 that conducts hot exhaust gases generated by an engine through various exhaust components to reduce emission and control noise as known. The various exhaust components can include one or more of the following: pipes, filters, valves, catalysts, mufflers etc. After passing though the various exhaust components, the engine exhaust gas exits the system 10 to atmosphere as known.

In one example configuration shown in FIG. 1, the vehicle exhaust system includes an exhaust pipe 12 defining an exhaust gas flow path and a heat recovery device 14 connected to the exhaust pipe 12. In one example, the heat recovery device 14 comprises a heat exchanger with a plurality of heat transfer fins or plates 16. The heat recovery device 14 has a device inlet 18 in fluid communication with the exhaust pipe 12 and a device outlet 20 in fluid communication with the exhaust pipe 12 downstream from the device inlet 18. In one example, the heat recovery device 14 is in parallel with the exhaust pipe 12 to provide a bypass configuration.

The vehicle exhaust system 10 further includes a diverter valve 22 that controls exhaust gas flow between the exhaust pipe 12 and heat recovery device 14. The diverter valve 22 is moveable between at least a heat recovery mode where the diverter valve 22 blocks flow through the exhaust pipe 12 and directs flow into the heat recovery device 14 (FIGS. 1A-1C), a transition mode where the diverter valve 22 partially blocks flow through the heat recovery device 14 and partially blocks flow through the exhaust pipe 12 (FIGS. 2A-2C), and a partial bypass acoustic mode where the diverter valve 22 blocks flow through the heat recovery device 14 and partially blocks flow through the exhaust pipe (FIGS. 4A-4C), and a full bypass acoustic mode where the diverter valve 22 blocks flow through the heat recovery device 14 and directs flow through the exhaust pipe (FIGS. 3A-3C).

The subject diverter valve 22 comprises a single valve that is used for both exhaust heat recovery and acoustic noise control. The valve 22 provides a simple binary valve function for the exhaust heat recovery (heat recovery mode or full bypass mode) as well as providing a variable valve function for acoustic throttling. The diverter valve 22 is mounted at the device outlet 20. The valve 22 is configured such that an outermost peripheral surface of the valve 22 does not come into contact with any inner wall surface within the exhaust pipe 12 or heat recovery device 14. As such, there will always be some mixing of flow through the device outlet 20 of heat recovery device 14 and exhaust pipe 12 at all times.

In the example shown in FIGS. 1A-5, the exhaust system 10 includes a barrel housing 24 that connects the device outlet 20 to the exhaust pipe 12. The exhaust pipe 12 has an upstream end 26 and a downstream end 28. The barrel housing 24 is connected to the exhaust pipe 12 between the upstream 26 and downstream 28 ends. The barrel housing 24 has a housing inlet 30 connected to the exhaust pipe 12 and has a housing outlet 32 connected to the exhaust pipe 12. The housing outlet 32 is downstream of the device outlet 20. Further, the barrel housing 24 includes a second housing inlet 34 that is connected to the device outlet 20.

Figure 5:
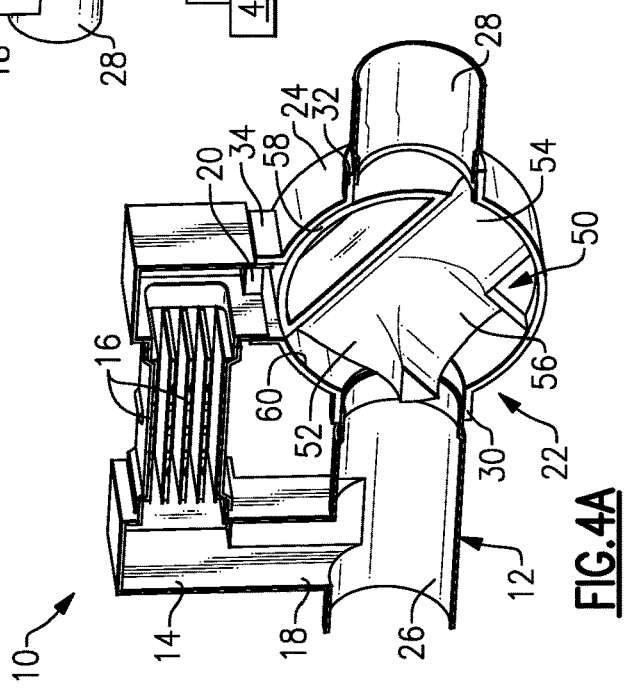
FIG. 5 is a perspective view of the diverter valve with an end cover of the housing removed.

As shown in FIG. 5, the diverter valve 22 is rotatably mounted within the barrel housing 24. The valve 22 is fixed for movement with a shaft 36 that is supported on a bearing 38. The shaft 36 is configured to rotate the valve 22 amongst the various operational positions. The shaft 36 is coupled to a valve drive 40, such as a motor, solenoid actuator, etc., which actively controls rotation of the shaft 36. An electronic control unit 42 generates signals to control the valve drive 40.

As shown in FIGS. 1A-4C, the diverter valve 22 comprises a valve body 50 having a first opening 52, a second opening 54 facing opposite the first opening 52, and a third opening 56 positioned between the first 52 and second 54 openings. The valve body 50 includes a curved portion 58 facing an inner surface 60 of the barrel housing 24. In the example shown, the curved portion 58 faces opposite of the third opening 56. Further, in one example, the first opening 52 has an increased area and tapered inlet to improve flow characteristics through the valve body 50.

Figure 1B:
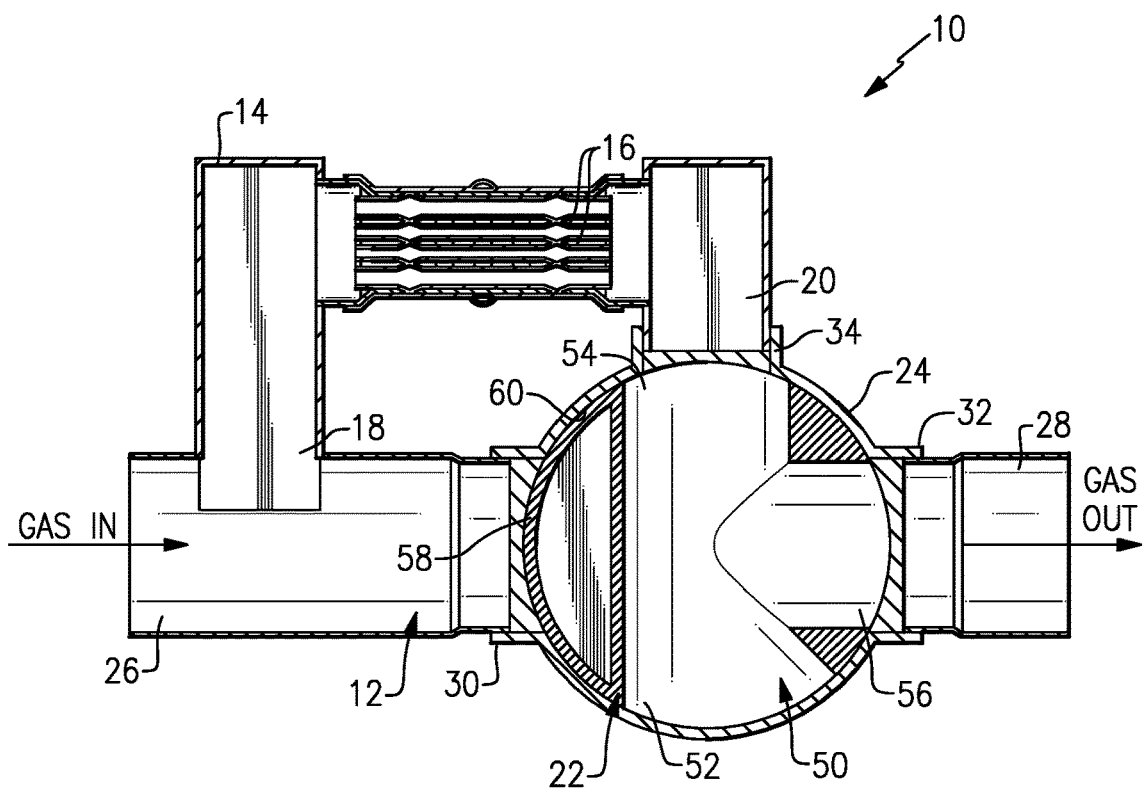
FIG. 1B is a side view of the diverter valve of FIG. 1A.
Figure 1C:
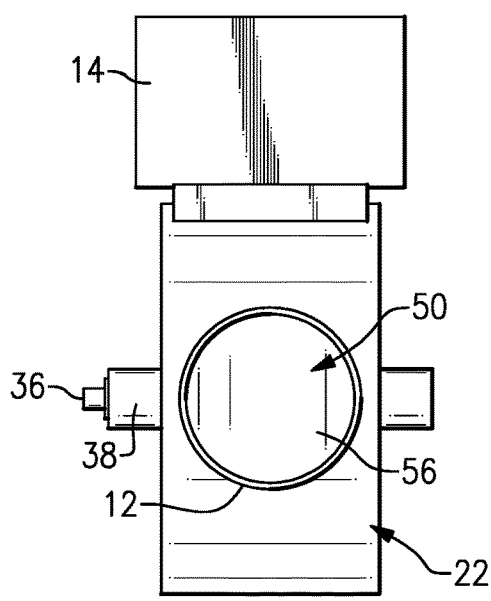
FIG. 1C is an outlet end view of the diverter valve of FIG. 1A.

FIGS. 1A-1C show the diverter valve 22 in the heat recovery mode where substantially all of the exhaust gas flow entering the upstream end 26 of the exhaust pipe 12 is directed into the device inlet 18. In this operational mode, the curved portion 58 blocks flow through the exhaust pipe 12, the first opening 52 is blocked by the barrel housing 24, the second opening 54 is fluidly connected to the device outlet 20, and the third opening 56 directs flow from the device outlet 20 back into the downstream end 28 of the exhaust pipe 12. The outermost surface of the curved portion 58 is spaced apart from the inner surface 60 of the barrel housing 24 by a small gap, i.e. the curved portion does not make contact with the housing 24. As such, a small amount of exhaust gas flows around the curved portion 58 to mix with exhaust gas exiting the device outlet 20; however, as shown in FIG. 1C, the valve body 50 is configured such that the flow path through the exhaust pipe is substantially blocked to achieve the full heat recovery mode.

Figure 2A:
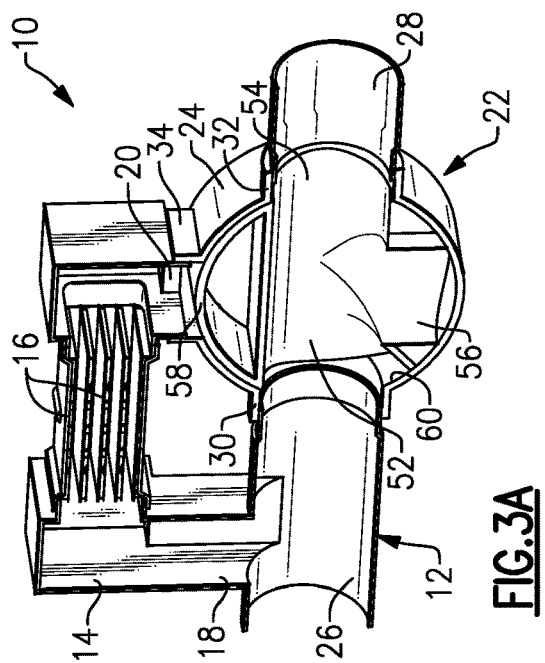
FIG. 2A is a perspective section view of a diverter valve in a transition mode.
Figure 3A:
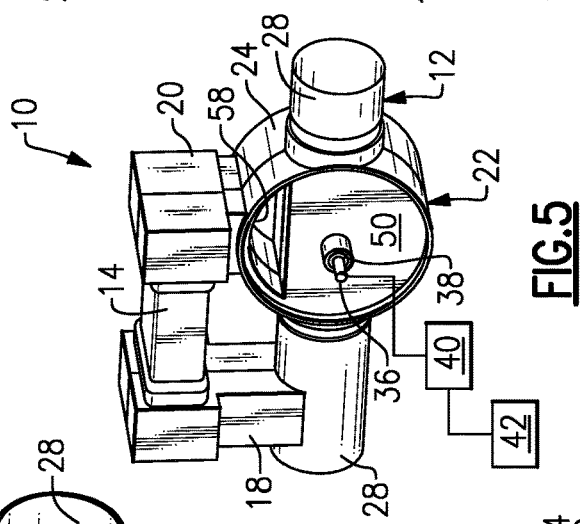
FIG. 3A is a perspective section view of a diverter valve in a full bypass acoustic mode.
Figure 2B:
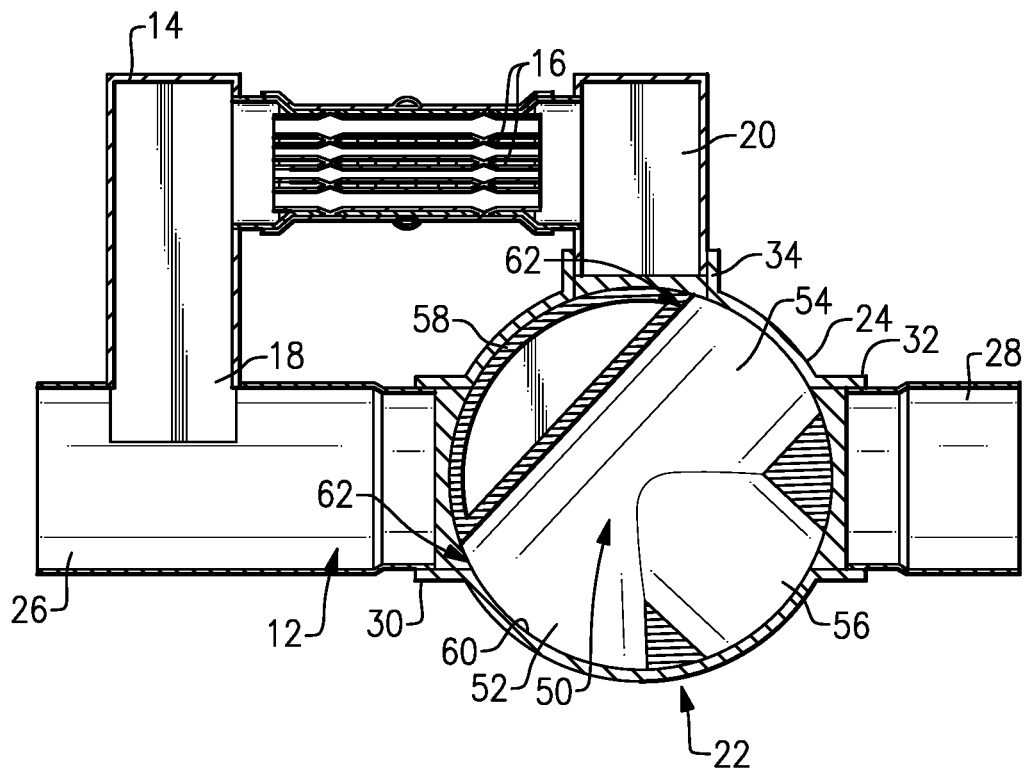
FIG. 2B is a side view of the diverter valve of FIG. 2A.
Figure 2C:
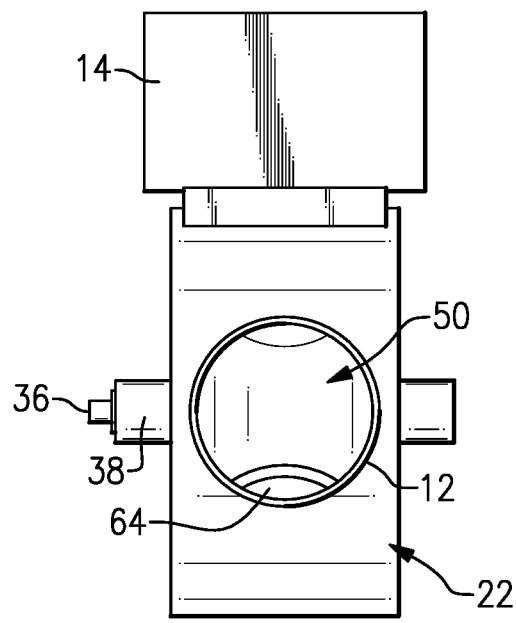
FIG. 2C is an outlet end view of the diverter valve of FIG. 2A.
Figure 3B:
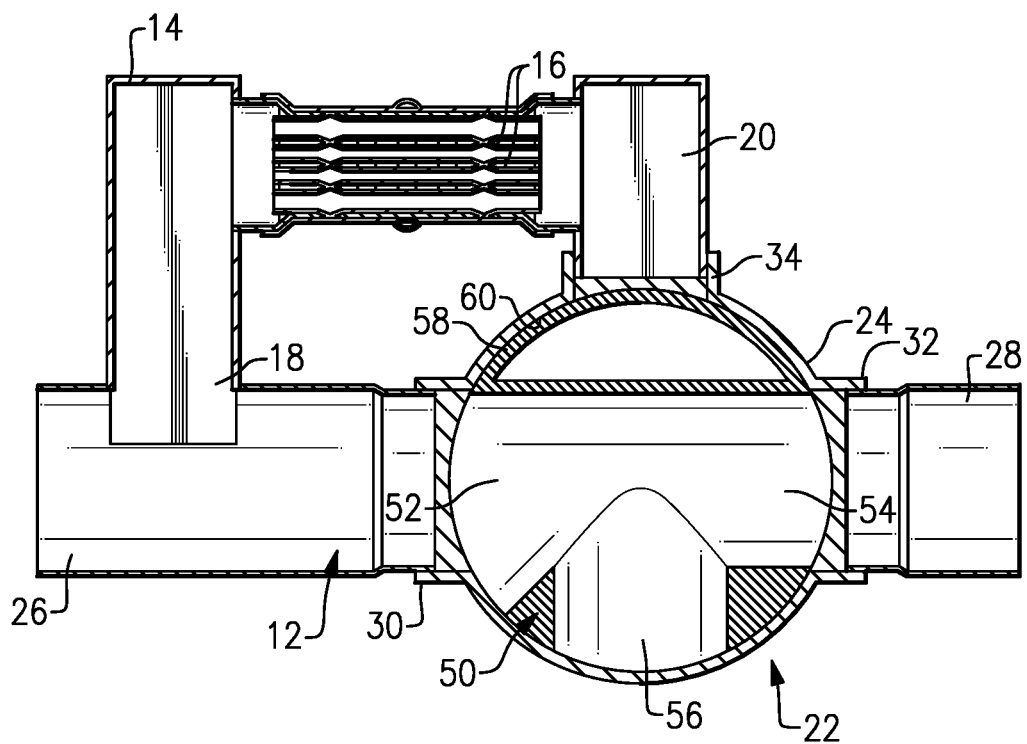
FIG. 3B is a side view of the diverter valve of FIG. 3A.
Figure 3C:
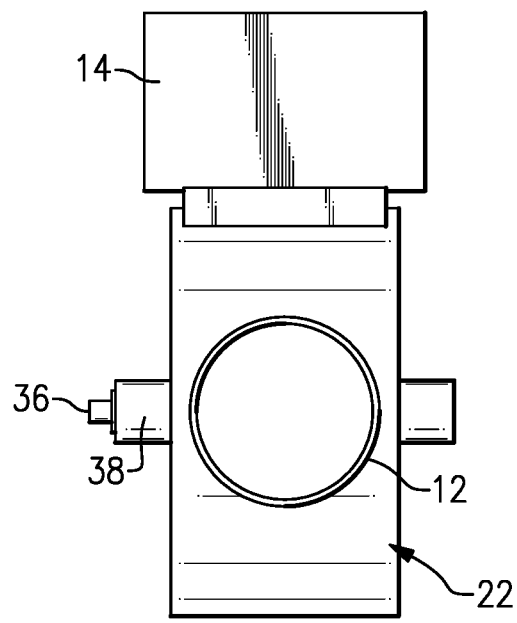
FIG. 3C is an outlet end view of the diverter valve of FIG. 3A.

FIGS. 2A-2C show the diverter valve 22 in the transition mode wherein exhaust gas flowing through the exhaust pipe 12 mixes with exhaust gas exiting the device outlet 20 as indicated at 62 in FIG. 2B. In this mode, the curved portion 58 partially blocks flow at the device outlet 20 and partially blocks flow through the exhaust pipe 12, the first opening 52 receives partial flow from the exhaust pipe 12, the second opening 54 receives partial flow from the device outlet 20, and the third opening 56 directs flow from first 52 and second 54 openings into the downstream end 28 of the exhaust pipe 12. As shown in FIG. 2C, a small amount of exhaust flows directly through the exhaust pipe 12, as indicated at 64, when in the transition mode.

FIGS. 3A-3C show the diverter valve 22 in the full bypass acoustic mode where exhaust gas bypasses the heat recovery device 14 such that substantially all exhaust gas flows through the exhaust pipe 12 from the upstream end 26 to the downstream end 28. In this mode, the curved portion 58 blocks flow at the device outlet 20, the first opening 52 receives flow from the upstream end 26 of the exhaust pipe 12, the second opening 54 directs flow from the first opening 52 into the downstream end 28 of the exhaust pipe 12, and the third opening 56 is blocked by the barrel housing 24. As shown in FIG. 3C, the valve body 50 does not block flow through the exhaust pipe 12 when in this mode.

Figure 4A:
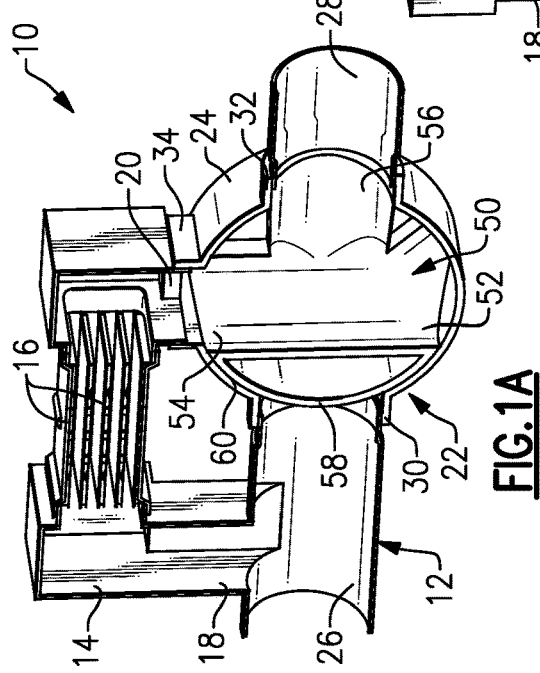
FIG. 4A is a perspective section view of a diverter valve in a partial bypass acoustic mode.
Figure 4B:
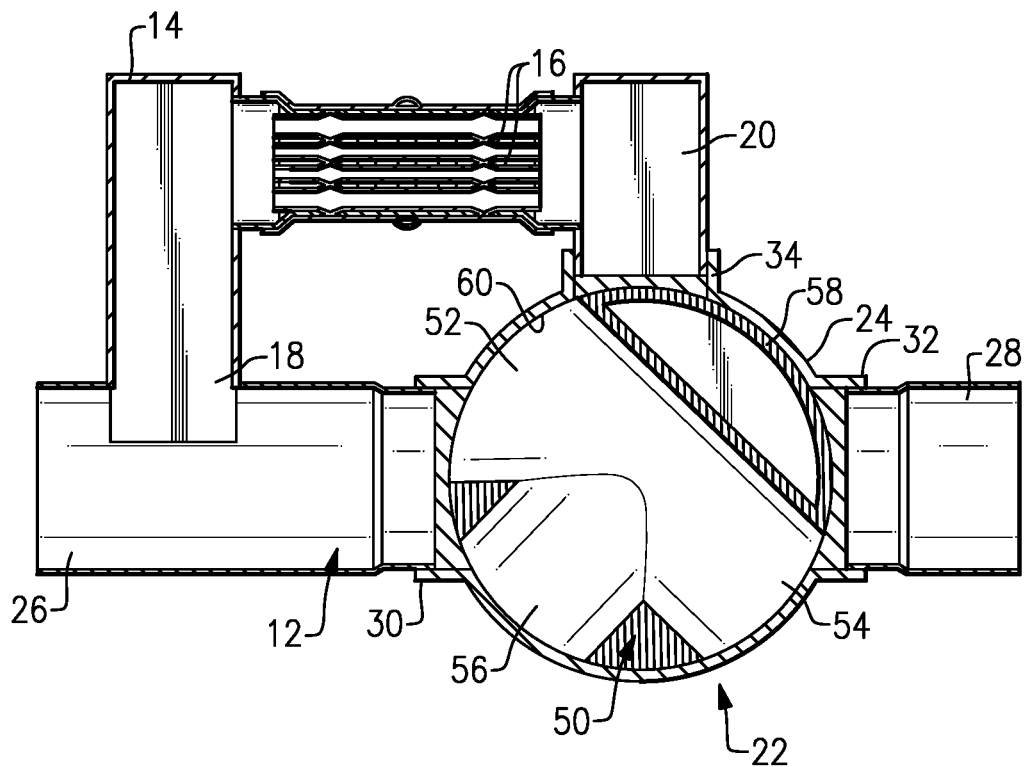
FIG. 4B is a side view of the diverter valve of FIG. 4A.
Figure 4C:
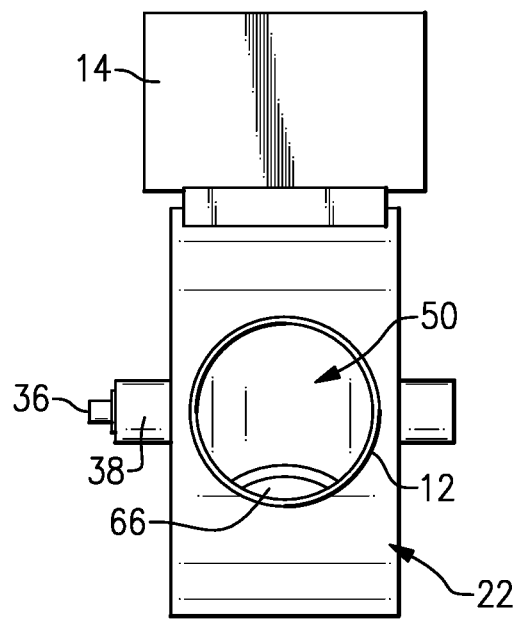
FIG. 4C is an outlet end view of the diverter valve of FIG. 4A.

FIGS. 4A-4C show the diverter valve 22 in the partial bypass acoustic mode where flow through the heat recovery device 14 is completely blocked while flow through the exhaust pipe 12 is only partially blocked. In this mode, the curved portion 58 blocks flow from the device outlet 20 and partially blocks flow through the exhaust pipe 12, the first opening 52 receives flow from the exhaust pipe 12, the third opening 56 receives flow from the exhaust pipe 12, and the second opening 54 directs flow from the first 52 and third 56 openings into the downstream end 28 of the exhaust pipe 12. As shown in FIG. 4C, a small amount of exhaust flows directly through the exhaust pipe 12, as indicated at 66, when in the partial bypass mode. In the example shown, approximately 10% of the exhaust flow is bypassing the heat recovery device 14 in this acoustic mode; however, the position of the curved portion 58 can be adjusted to increase or decrease this percentage in order to achieve a desired acoustic throttling.

As best shown in FIGS. 1A, 2A, 3A, 4A, and 5, the barrel housing 24 comprises a round housing that encloses the valve body 50 within. These figures show the housing 24 with one side cover portion removed such that the valve body 50 can be seen in the various operational positions. In one example, the valve body 50 comprises a single-piece body that has a T-shaped portion that includes the first 52, second 54, and third 56 openings. The curved portion 58 is positioned to round off the head portion of the T-shape. The curved portion 58 is also hollowed out in a central area to decrease the weight of the valve body 50. As discussed above, the valve body 50 is mounted for rotation with the shaft 56 within the barrel housing 24 between the various operational positions.

FIGS. 6A-9B show another example configuration of a diverter valve 70. This configuration operates similar to the diverter valve 22 described above, but has a different valve body configuration. Further, this configuration has a polygonal, i.e. multi-sided, shape for the exhaust pipe 12. In this example embodiment, a curved or barrel valve housing 72 connects the exhaust pipe 12 to the device outlet 20. The housing 72 has a first opening 74 in fluid communication with an upstream end 26 of the exhaust pipe 12, a second opening 76 downstream of the first opening 74 and in fluid communication with the downstream end 28 of the exhaust pipe 12, and a third opening 78 in fluid communication with the device outlet 20. In one example configuration, the first 74 and second 76 openings are spaced 180 degrees apart from each other while the third opening 78 is approximately spaced 90 degrees apart from the first 74 and second 76 openings.

The diverter valve 70 comprises a valve body 80 supported on a shaft 82 for rotation relative to the housing 72. The valve body 80 includes a curved portion 84 spaced apart from an inner surface 86 of the housing 72 by a gap 88. The curved portion 84 comprises a hemispherical shape in this configuration. The valve body 80 further includes a narrowing portion 90 that extends radially inwardly from opposing peripheral edges of the curved portion 84 to a mount interface to the shaft 82.

Figures 6A, 6B:
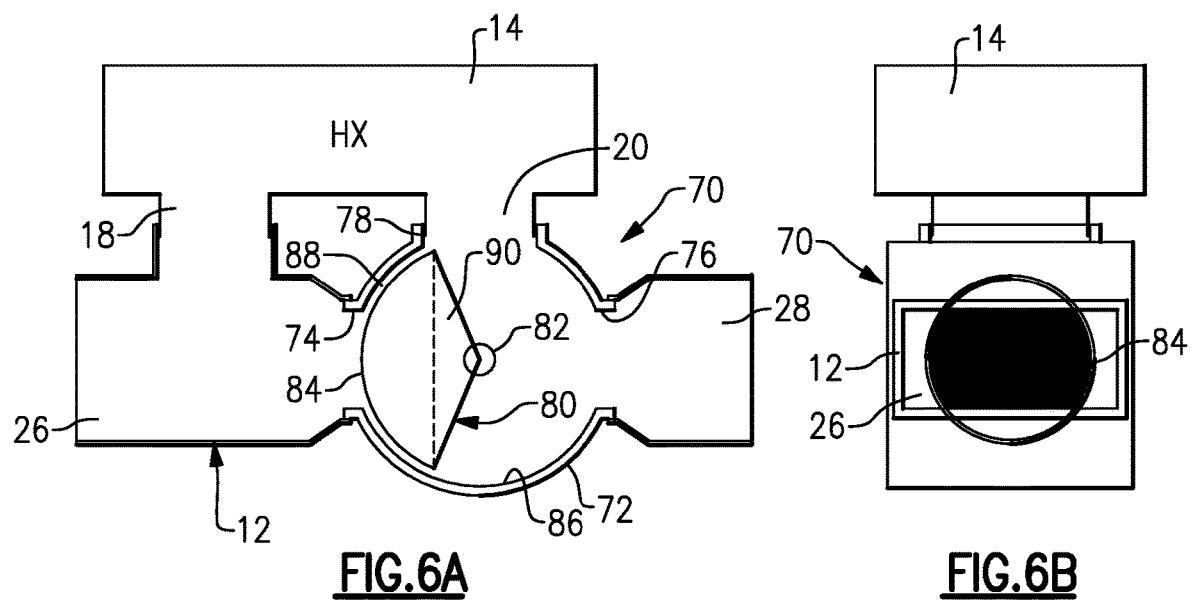
FIG. 6A is a side view of another example of a diverter valve in a heat recovery mode.
FIG. 6B is an inlet end view of the diverter valve of FIG. 6A.

FIGS. 6A-6B show the diverter valve 70 in the heat recovery mode where substantially all of the exhaust gas flow entering the upstream end 26 of the exhaust pipe 12 is directed into the device inlet 18. In this operational mode, the curved portion 84 blocks the first opening 74, flow is directed through the heat recovery device 14, flow exits the device outlet 20 and flows through the third opening 78, and flow exits the housing 72 via the second opening 76 and returns to the downstream end 28 of the exhaust pipe 12. As shown in FIG. 6B and as viewed from the inlet end, flow through the exhaust pipe 12 is substantially blocked by the valve body 80. However, due to the gap 88, a small amount of exhaust gas does bypass the body 80 to mix with the exhaust gas exiting the device outlet 20.

Figures 7A, 7B:
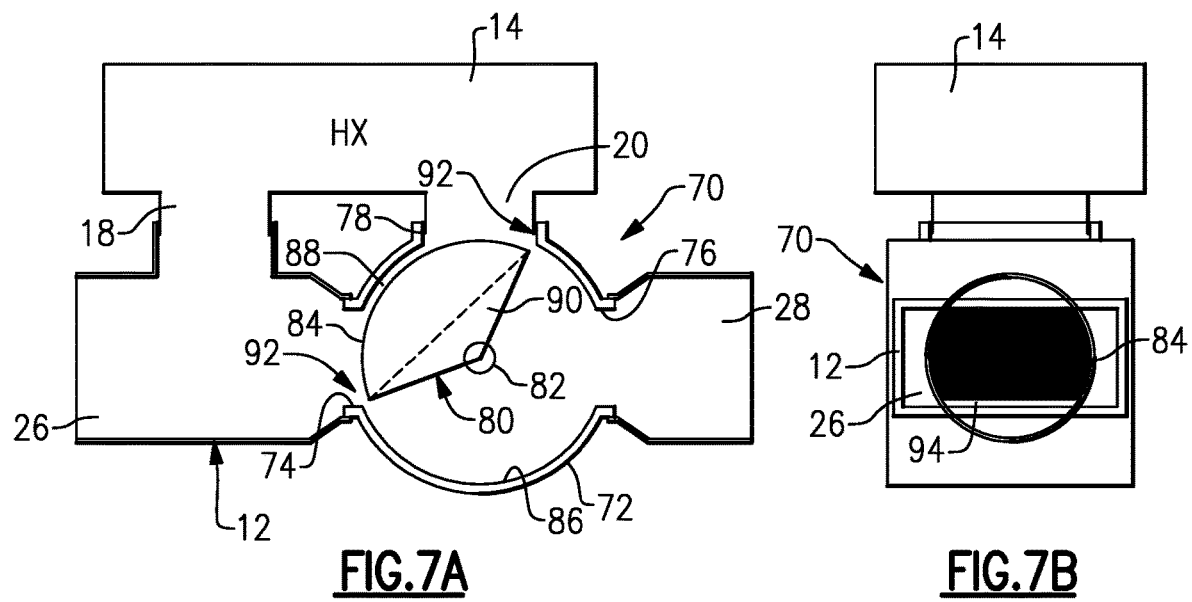
FIG. 7A is a side view of another example of a diverter valve in a transition mode.
FIG. 7B is an inlet end view of the diverter valve of FIG. 7A.

FIGS. 7A-7B show the diverter valve 70 in the transition mode where exhaust gas flowing through the exhaust pipe 12 mixes with exhaust gas exiting the device outlet 20 as indicated at 92 in FIG. 7A. In this mode, the curved portion 84 partially blocks the first opening 74, the curved portion 84 partially blocks the third opening 78, and flow entering the housing 72 from the first 74 and third 78 openings is directed through the second opening 76 and into the downstream end 28 of the exhaust pipe 12. As shown in FIG. 7B and as viewed from the inlet end, a small amount of exhaust flows directly through the exhaust pipe 12, as indicated at 94, when in the transition mode.

Figures 8A, 8B:
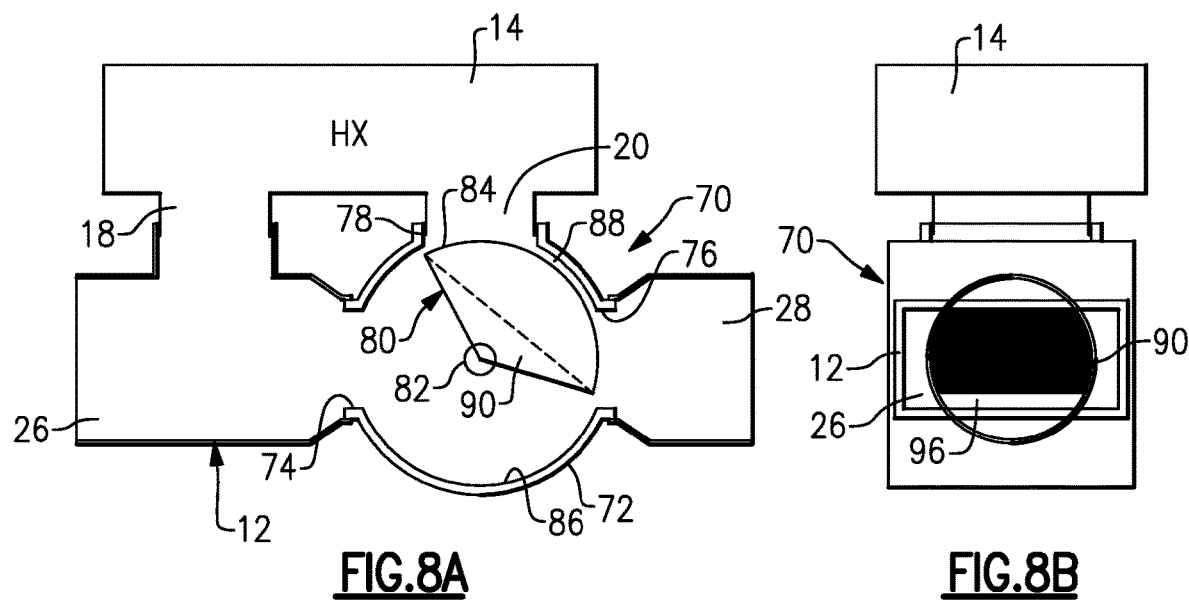
FIG. 8A is a side view of another example of a diverter valve in a partial bypass acoustic mode.
FIG. 8B is an inlet end view of the diverter valve of FIG. 8A.

FIGS. 8A-8B show the diverter valve 70 in the partial bypass acoustic mode where flow through the heat recovery device 14 is completely blocked while flow through the exhaust pipe 12 is only partially blocked. In this mode, the curved portion 84 blocks the third opening 78 at the device outlet 20, the curved portion 84 partially blocks the second opening 76, and exhaust gas flows through the housing 72 from the first opening 74 to the second opening 76 and into the downstream end 28 of the exhaust pipe 12. As shown in FIG. 8B and as viewed from the inlet end, a small amount of exhaust flows directly through the exhaust pipe 12, as indicated at 96, when in the partial bypass mode. In the example shown, approximately 10% of the exhaust flow is bypassing the heat recovery device 14 in this acoustic mode; however, the position of the curved portion 84 can be adjusted to increase or decrease this percentage in order to achieve a desired acoustic throttling.

Figures 9A, 9B:
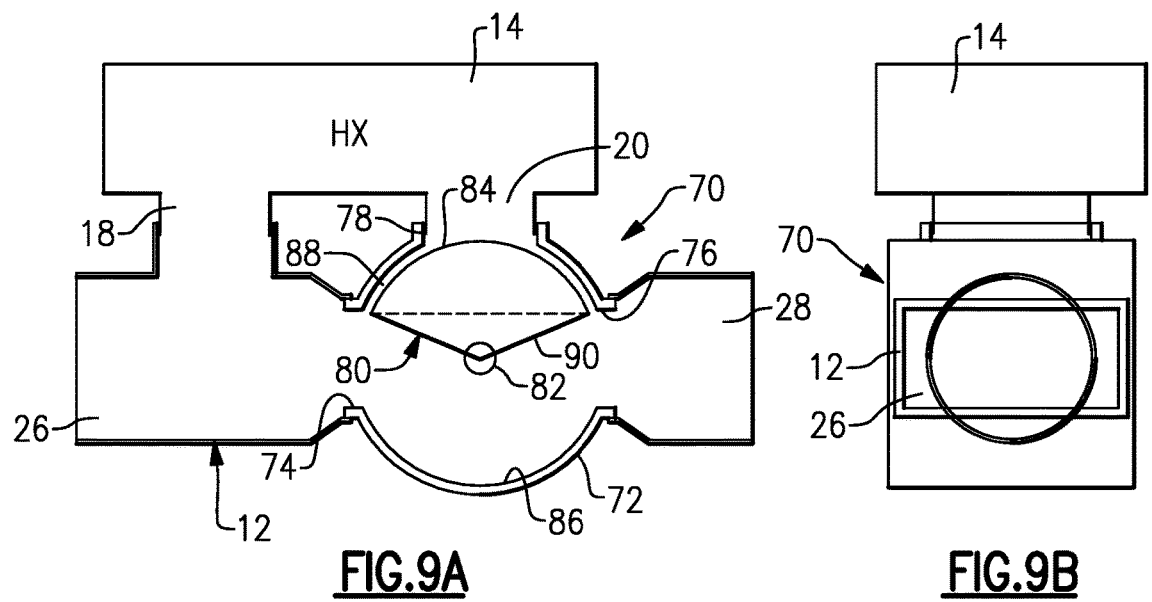
FIG. 9A is a side view of another example of a diverter valve in a full bypass acoustic mode.
FIG. 9B is an inlet end view of the diverter valve of FIG. 9A.

FIGS. 9A-9B show the diverter valve 70 in the full bypass acoustic mode where exhaust gas bypasses the heat recovery device 14 such that substantially all exhaust gas flows through the exhaust pipe 12 from the upstream end 26 to the downstream end 28. In this mode, the curved portion 84 blocks the third opening 78 at the device outlet 20, and exhaust gas flows through the housing 72 from the first opening 74 to the second opening and bypasses the heat recovery device. As shown in FIG. 9B as viewed from the inlet end, the valve body 80 does not block flow through the exhaust pipe 12 when in this mode.

FIGS. 10A-13B show another example configuration of a diverter valve 70'. This configuration operates similar to the diverter valve 70 described above, but has a different valve body configuration. Further, this configuration has a round pipe 12 instead of a polygonal pipe. In this example embodiment, a curved or barrel valve housing 72' connects the exhaust pipe 12 to the device outlet 20. The housing 72' has a first opening 74' in fluid communication with an upstream end 26 of the exhaust pipe 12, a second opening 76' downstream of the first opening 74' and in fluid communication with the downstream end 28 of the exhaust pipe 12, and a third opening 78' in fluid communication with the device outlet 20. In one example configuration, the first 74' and second 76' openings are spaced 180 degrees apart from each other while the third opening 78' is approximately spaced only 45 degrees from the first opening 74'.

The diverter valve 70' comprises a valve body 80' supported on a shaft 82' for rotation relative to the housing 72'. The valve body 80' includes a curved portion 84' spaced apart from an inner surface 86' of the housing 72' by a gap 88'. The curved portion 84' comprises a pie or wedge shape in this configuration. The curved portion 84' transitions radially inwardly to an apex area 90' at a mount interface to the shaft 82'.

FIGS. 10A-10B show the diverter valve 70' in the heat recovery mode where substantially all of the exhaust gas flow entering the upstream end 26 of the exhaust pipe 12 is directed into the device inlet 18. In this operational mode, the curved portion 84' blocks the first opening 74', flow is directed through the heat recovery device 14, flow exits the device outlet 20 and flows through the third opening 78', and flow exits the housing 72' via the second opening 76' and returns to the downstream end 28 of the exhaust pipe 12. As shown in FIG. 10B and as viewed from the inlet end, flow through the exhaust pipe 12 is substantially blocked by the valve body 80'. However, due to the gap 88', a small amount of exhaust gas does bypass the body 80' to mix with the exhaust gas exiting the device outlet 20.

FIGS. 11A-11B show the diverter valve 70' in the transition mode where exhaust gas flowing through the exhaust pipe 12 mixes with exhaust gas exiting the device outlet 20 as indicated at 92' in FIG. 11A. In this mode, the curved portion 84' partially blocks the first opening 74', the curved portion 84' partially blocks the third opening 78', and flow entering the housing 72' from the first 74' and third 78' openings is directed through the second opening 76' and into the downstream end 28 of the exhaust pipe 12. As shown in FIG. 11B and as viewed from the inlet end, a small amount of exhaust flows directly through the exhaust pipe 12, as indicated at 94', when in the transition mode.

Figures 12A, 12B:
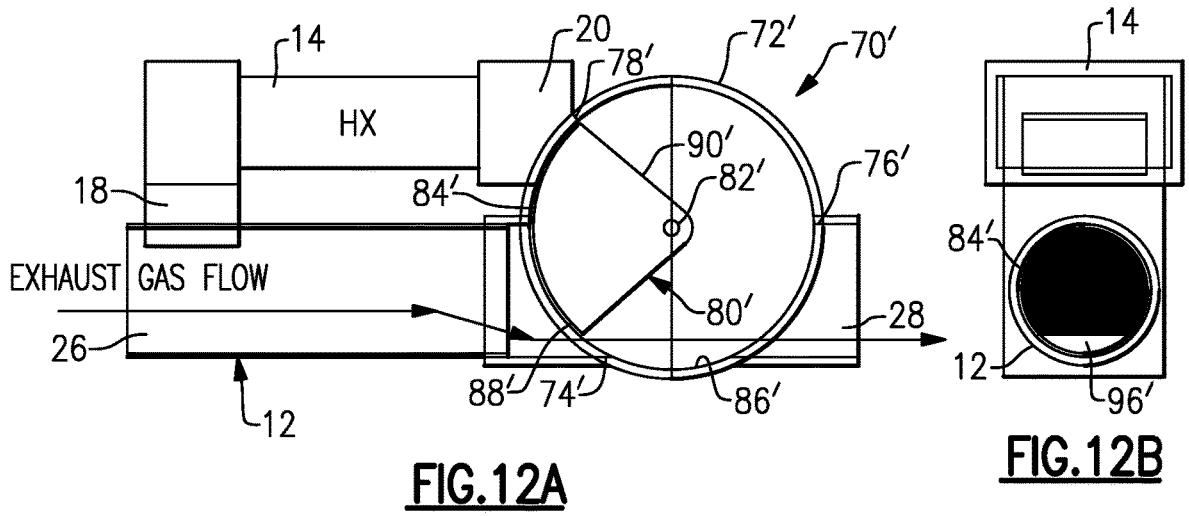
FIG. 12A is a side view of another example of a diverter valve in a partial bypass acoustic mode.
FIG. 12B is an inlet end view of the diverter valve of FIG. 12A.

FIGS. 12A-12B show the diverter valve 70' in the partial bypass acoustic mode where flow through the heat recovery device 14 is completely blocked while flow through the exhaust pipe 12 is only partially blocked. In this mode, the curved portion 84' blocks the third opening 78' at the device outlet 20, the curved portion 84' partially blocks the first opening 74', and exhaust gas flows through the housing 72' from the first opening 74' to the second opening 76' and into the downstream end 28 of the exhaust pipe 12. As shown in FIG. 12B and as viewed from the inlet end, a small amount of exhaust flows directly through the exhaust pipe 12, as indicated at 96', when in the partial bypass mode. In the example shown, approximately 10% of the exhaust flow is bypassing the heat recovery device 14 in this acoustic mode; however, the position of the curved portion 84' can be adjusted to increase or decrease this percentage in order to achieve a desired acoustic throttling.

Figures 13A, 13B:
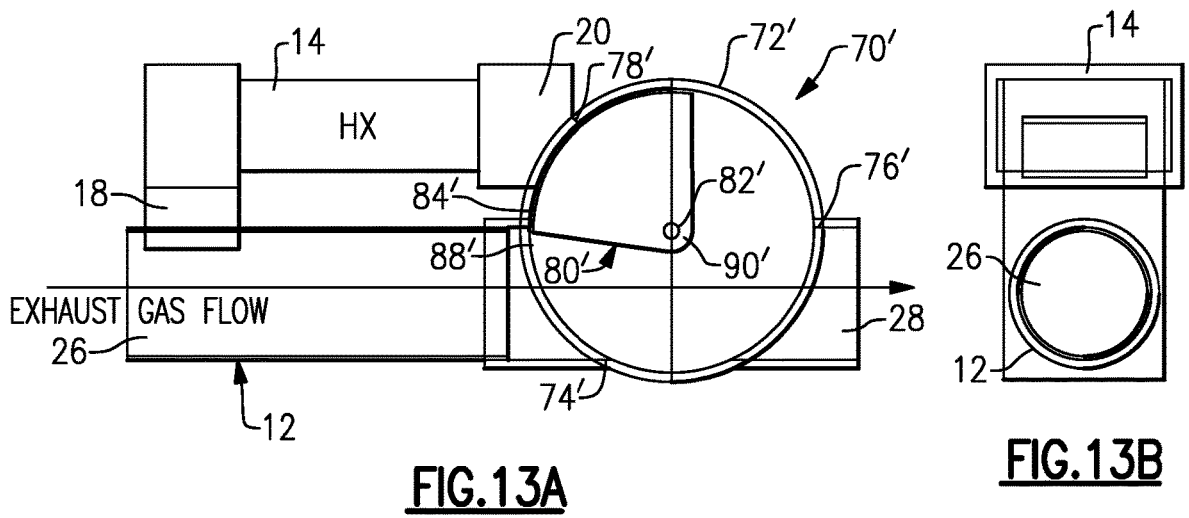
FIG. 13A is a side view of another example of a diverter valve in a full bypass acoustic mode.
FIG. 13B is an inlet end view of the diverter valve of FIG. 13A.

FIGS. 13A-13B show the diverter valve 70' in the full bypass acoustic mode where exhaust gas bypasses the heat recovery device 14 such that substantially all exhaust gas flows through the exhaust pipe 12 from the upstream end 26 to the downstream end 28. In this mode, the curved portion 84' blocks the third opening 78' at the device outlet 20, and exhaust gas flows through the housing 72' from the first opening 74' to the second opening and bypasses the heat recovery device 14. As shown in FIG. 13B as viewed from the inlet end, the valve body 80 does not block flow through the exhaust pipe 12 when in this mode.

In each of the examples, the outer peripheral surface of the rounded/curved portion of the valve body has a circumferential length that is greater than a width of the openings at the inlets to the valve housing. Thus, the valve body can be rotated to a position where the rounded portion can cover each inlet opening completely, and can also be rotated to a position where the rounded portion partially covers each opening simultaneously to provide a desired acoustic effect.

Further, by having both passages slightly open, with a very high mass flow rate, a low back pressure can be maintained while acquiring heat recovered power. Further, the heat recovery device can be used as an additional acoustic element and the gas temperature will be lower resulting in reduced tail pipe noise. Additionally, during transitional movement pressure spikes are minimized as neither inlet passage to the valve housing is ever completely closed.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust component comprising:
   an exhaust pipe defining an exhaust gas flow path;
   a heat recovery device connected to the exhaust pipe; and
   a diverter valve that controls exhaust gas flow between the exhaust pipe and heat recovery device, the diverter valve being moveable between at least a heat recovery mode where the diverter valve blocks flow through the exhaust pipe and directs flow into the heat recovery device, a full bypass acoustic mode where the diverter valve blocks flow through the heat recovery device and directs flow through the exhaust pipe, a transition mode where the diverter valve partially blocks flow through the heat recovery device and partially blocks flow through the exhaust pipe, and a partial bypass acoustic mode where the diverter valve blocks flow through the heat recovery device and partially blocks flow through the exhaust pipe.

2. The vehicle exhaust component according to claim 1, wherein the diverter valve comprises a single valve for exhaust heat recovery and acoustic noise control.

3. The vehicle exhaust component according to claim 1, wherein the heat recovery device is mounted in parallel to the exhaust pipe and has a device inlet in fluid communication with the exhaust pipe and a device outlet in fluid communication with the exhaust pipe, the device outlet being downstream of the device inlet.

4. The vehicle exhaust component according to claim 3, wherein the diverter valve is mounted at the device outlet.

5. The vehicle exhaust component according to claim 3, including a barrel housing connecting the exhaust pipe to the device outlet, and wherein the diverter valve is rotatably mounted within the barrel housing.

6. The vehicle exhaust component according to claim 5, wherein the diverter valve comprises a valve body having a first opening, a second opening facing opposite the first opening, and a third opening positioned between the first and second openings, and wherein the valve body includes a curved portion facing an inner surface of the barrel housing.

7. The vehicle exhaust component according to claim 6, wherein the curved portion faces opposite of the third opening.

8. The vehicle exhaust component according to claim 7, wherein, when in the heat recovery mode:
   the curved portion blocks flow through the exhaust pipe,
   the first opening is blocked by the barrel housing,
   the second opening is fluidly connected to the device outlet, and the third opening directs flow from the device outlet back into the exhaust pipe downstream of the heat recovery device.

9. The vehicle exhaust component according to claim 7, wherein, when in the full bypass acoustic mode:
the curved portion blocks flow from the device outlet,
the first opening receives flow from the exhaust pipe,
the second opening directs flow from the first opening into the exhaust pipe downstream of the heat recovery device, and
the third opening is blocked by the barrel housing.

10. The vehicle exhaust component according to claim 7, wherein, when in the transition mode:
the curved portion partially blocks flow at the device outlet and partially blocks flow through the exhaust pipe,
the first opening receives partial flow from the exhaust pipe,
the second opening receives partial flow from the device outlet, and
the third opening directs flow from first and second openings into the exhaust pipe downstream of the heat recovery device.

11. The vehicle exhaust component according to claim 7, wherein, when in the partial bypass acoustic mode:
the curved portion blocks flow from the device outlet and partially blocks flow through the exhaust pipe,
the first opening receives flow from the exhaust pipe,
the third opening receives flow from the exhaust pipe, and
the second opening directs flow from the first and third openings into the exhaust pipe downstream of the heat recovery device.

12. The vehicle exhaust component according to claim 5, wherein the diverter valve has an outermost peripheral surface that does not contact an inner surface of the barrel housing as the diverter valve rotates within the barrel housing.

13. The vehicle exhaust component according to claim 4, including a curved valve housing connecting the exhaust pipe to the device outlet, the curved valve housing having a first opening in fluid communication with an upstream portion of the exhaust pipe, a second opening downstream of the first opening and in fluid communication with the exhaust pipe, and a third opening in fluid communication with the device outlet, and wherein the diverter valve comprises a valve body supported on a shaft for rotation relative to the curved valve housing, the valve body including a curved portion spaced apart from an inner surface of the curved valve housing by a gap.

14. The vehicle exhaust component according to claim 13, wherein the curved portion comprises one of a hemispherical shape or wedge shape.

15. The vehicle exhaust component according to claim 13, wherein, when in the heat recovery mode:
the curved portion blocks the first opening,
flow is directed through the heat recovery device,
flow exits the device outlet and flows through the third opening, and
flow exits the housing via the second opening and returns to the exhaust pipe.

16. The vehicle exhaust component according to claim 13, wherein, when in the full bypass acoustic mode:
the curved portion blocks the third opening at the device outlet, and
exhaust gas flows through the housing from the first opening to the second opening and bypasses the heat recovery device.

17. The vehicle exhaust component according to claim 13, wherein, when in the transition mode:
the curved portion partially blocks the first opening,
the curved portion partially blocks the third opening, and
flow entering the housing from the first and third openings is directed through the second opening and into the exhaust pipe downstream of the heat recovery device.

18. The vehicle exhaust component according to claim 13, wherein, when in the partial bypass acoustic mode:
the curved portion blocks the third opening at the device outlet,
the curved portion partially blocks the second opening, and
exhaust gas flows through the housing from the first opening to the second opening and into the exhaust pipe downstream of the heat recovery device.

19. The vehicle exhaust component according to claim 1, including an electronic controller that controls movement of the diverter valve between the heat recovery mode, the full bypass acoustic mode, the transition mode, and the partial bypass acoustic mode.

20. A method of controlling exhaust gas flow through a vehicle exhaust system comprising:
connecting a heat recovery device to an exhaust pipe; and
positioning a diverter valve to control exhaust gas flow between the exhaust pipe, and the heat recovery device, such that the diverter valve is moveable between at least
a heat recovery mode where the diverter valve blocks flow through the exhaust pipe and directs flow into the heat recovery device,
a full bypass acoustic mode where the diverter valve blocks flow through the heat recovery device and directs flow through the exhaust pipe,
a transition mode where the diverter valve partially blocks flow through the heat recovery device and partially blocks flow through the exhaust pipe, and
a partial bypass acoustic mode where the diverter valve blocks flow through the heat recovery device and partially blocks flow through the exhaust pipe.

21. The method according to claim 20, including providing the diverter valve by mounting a valve body having a curved portion in a valve housing, and wherein the curved portion has an outermost peripheral surface that does not contact an inner surface of the valve housing as the valve body rotates within the valve housing between the heat recovery mode, the full bypass acoustic mode, the transition mode, and the partial bypass acoustic mode.

22. The method according to claim 20, including providing the diverter valve by mounting a valve body having a curved portion in a valve housing, and further including providing the heat recovery device with a device inlet and a device outlet to connect the heat recovery device to the exhaust pipe, and including having the curved portion block the device inlet or outlet when operating in the full bypass acoustic mode, and having the curved portion block the device inlet or outlet when operating in the partial bypass acoustic mode.

23. The vehicle exhaust component according to claim 1, wherein the diverter valve comprises a valve body having a curved portion positioned in a valve housing, and wherein the curved portion has an outermost peripheral surface that does not contact an inner surface of the valve housing as the valve body rotates within the valve housing.

24. The vehicle exhaust component according to claim 1, wherein the diverter valve comprises a valve body having a curved portion positioned in a valve housing, and wherein the curved portion has an outermost peripheral surface that is spaced apart from an inner surface of the valve housing by a gap as the valve body rotates between the heat recovery mode, the full bypass acoustic mode, the transition mode, and the partial bypass acoustic mode.

25. The vehicle exhaust component according to claim 1, wherein the diverter valve comprises a valve body having a curved portion positioned in a valve housing, and including a device inlet and a device outlet that connect the heat recovery device to the exhaust pipe, and wherein the curved portion blocks the device inlet or outlet when operating in the full bypass acoustic mode, and wherein the curved portion blocks the device inlet or outlet when operating in the partial bypass acoustic mode.

* * * * *